(12) United States Patent
Sakai

(10) Patent No.: US 7,197,303 B2
(45) Date of Patent: Mar. 27, 2007

(54) CELLULAR COMMUNICATION SYSTEM WHICH ENABLES IMPROVED INTERFERENCE MONITORING AND METHOD OF MONITORING INTERFERENCE

(75) Inventor: Hiroshi Sakai, Tokyo (JP)

(73) Assignee: NEC Infrontia Corporation, Tokyo (JP)

( * ) Notice: Subject to any disclaimer, the term of this patent is extended or adjusted under 35 U.S.C. 154(b) by 769 days.

(21) Appl. No.: 10/015,795

(22) Filed: Dec. 17, 2001

(65) Prior Publication Data

US 2002/0082004 A1 Jun. 27, 2002

(30) Foreign Application Priority Data

Dec. 21, 2000 (JP) ............................. 2000-388206

(51) Int. Cl.
*H04Q 7/20* (2006.01)

(52) U.S. Cl. .................. 455/423; 455/63.1; 455/67.11; 455/424; 455/452.2

(58) Field of Classification Search ................ 455/423, 455/424, 447, 450, 9, 10, 515, 63, 426.1, 455/456.1, 504, 507, 25, 67.13, 67.11, 63.1, 455/452.2
See application file for complete search history.

(56) References Cited

U.S. PATENT DOCUMENTS 4,837,801 A * 6/1989 Shimura ..................... 455/561
5,408,514 A * 4/1995 Sakamoto et al. ........... 455/436
5,845,209 A * 12/1998 Iwata .......................... 455/423
5,920,607 A * 7/1999 Berg .......................... 379/1.01
5,995,515 A * 11/1999 Suzuki ........................ 370/465
6,052,605 A * 4/2000 Meredith et al. ........... 455/561
6,282,408 B1 * 8/2001 Jang ......................... 455/67.13
6,321,087 B1 * 11/2001 Do ............................ 455/436
6,684,061 B1 * 1/2004 Yost ........................... 455/423
2001/0046867 A1 * 11/2001 Mizoguchi .................. 455/452

FOREIGN PATENT DOCUMENTS

| JP | 8-331637 | 12/1996 |
| JP | 9-107578 A | 4/1997 |
| JP | 2661533 | 6/1997 |
| JP | 2699854 | 9/1997 |
| JP | 11-196057 A | 7/1999 |
| JP | 11-341555 | 12/1999 |
| JP | 3029576 | 2/2000 |

* cited by examiner

*Primary Examiner*—Binh K. Tieu
(74) *Attorney, Agent, or Firm*—Sughrue Mion, PLLC

(57) ABSTRACT

A cellular communication system that enables an improved monitoring of interference is provided. The cellular communication system includes a cell station and a maintenance terminal. The cell station provides a communication service for a personal station, and also executes continuous monitoring of an interfering wave during a period to produce an interference monitor data representative of a property of the interfering wave. The maintenance terminal produces an interference profile based on the property.

19 Claims, 4 Drawing Sheets

CELLULAR COMMUNICATION SYSTEM WHICH ENABLES IMPROVED INTERFERENCE MONITORING AND METHOD OF MONITORING INTERFERENCE

BACKGROUND OF THE INVENTION

1. Field of the Invention

The present invention is related to a cellular communication system. In particular, the present invention is related to a cellular communication system that enables an improved interference monitoring.

2. Description of the Related Art

Interference is one of the issues in a cellular communication system. The interference degrades the service quality of the cellular communication system. Especially, interference from another independent cellular communication system often causes serious influence on the service quality. The influence of the interference should be suppressed to provide superior service quality.

Cellular communication systems are often designed so as to suppress the influence of the interference. Hamabe discloses a cellular communication system for suppressing the influence of the interference in Japanese Patent Gazette (JP-B 2661533). A cell station in the disclosed cellular communication system includes a direct wave direction determining unit for determining the incoming direction of a direct wave from a personal station, and an interfering wave direction determining unit for determining the incoming direction of an interfering wave. The cell station selects one of channels such that the angle between the incoming directions of the interfering wave and the direct wave is close to 180°. The selected channel is allocated to the communication service. This results in that the personal station receives the direct wave and the interfering wave in the same direction, and thus improves the intensity ratio of the direct wave and the interfering wave. Accordingly, the influence of the interference is reduced in the cellular communication system.

Hamabe also discloses another cellular communication technique for avoiding the interference in Japanese Open Laid Patent Application (JP-A-Heisei 11-341555). The cellular communication technique aims to reduce interference between a plurality of cellular systems, which are denoted by A and B, whose service areas are overlapped each other. The cellular system A is allowed to use a plurality of carrier frequencies, one of which is adjacent to a carrier frequency which cellular communication systems B is allowed to use, and others of which are not adjacent thereto. The cellular system A uses the carrier frequency not adjacent to the carrier frequency used by the cellular system B when received power of a pilot channel sent by a cell station of the cellular system B is higher than that of a pilot channel sent by a cell station of the cellular system A.

Kanei discloses still another cellular communication system in Japanese Patent Gazette (JP-B 2699854), which decreases a number of frequencies at which carrier-to-interference ratios are measured while the channel allocation. In the cellular communication system, communication channels are classified into first and second channel groups. The communication channels classified into the first channel group are given the same priority, while the other communication channels classified into the second channel group are respectively given a specific priorities. The priorities given to the communication channels classified into the second channel group are modified in response to the interference level of the communication channels. Autonomous Reuse Partitioning is utilized for allocating the communication channels. When a mobile station request a communication, carrier to-interference ratios (CIRs) are detected in the order of the priority. When a detected CIR is firstly satisfied with a predetermined CIR condition, the communication channel corresponding to the detected CIR is allocated to the mobile station.

Fukui et al. disclose still another cellular communication system in Japanese Open Laid Patent Application (JP-A-Heisei 8-331637). In the cellular communication system, a mobile station measures carrier-to-interference ratios (CIRs) to store them therein. The mobile station makes prospect of the CIR on the basis of the stored CIRs. When the mobile station requests communication, the mobile station selects one of the communication channels on the basis of the prospect of the CIR.

Ogura et al. disclose still another cellular communication system for improving frequency utilization efficiency in Japanese Patent Gazette (JP-B 3029576). In the cellular communication system, cell stations respectively transmit interference measuring channels. A mobile station measures the electric field intensities of received signals transmitted on the interference measuring channels. The distances between the mobile station and the cell stations are estimated on the basis of the electric field intensities. The allocation order of the communication channels is modified on the basis of the estimated distances to improving frequency utilization efficiency.

To design a cellular communication system so as to suppress the influence of the interference, a detailed monitoring of the interference profile is helpful.

Conventional communication protocols such as a time division multiple access (TDMA) system protocol and a code division multiple access (CDMA) system protocol, execute a detection of the interference. The communication system allows a mobile station and a cell station to communicate after ensuring that the interference is below the predetermined level.

However, the interference detection executed by the usual communication protocol is not satisfactory for designing the cellular communication system. The detection is executed only at timings predetermined by the communication protocol. This means that the interference is detected only at a predetermined interval, that is, the interference is not detected while user messages are being communicated.

To obtain a detailed interference profile, interference measurement apparatuses are often used. For obtaining a detailed interference profile, an interference measurement apparatus is set beside the cell stations, and the interference in the cellular communication system is monitored with the interference measurement apparatus for a desired duration.

An improved technique is desired which enables acquisition of a detailed profile of interference in a cellular communication system.

SUMMARY OF THE INVENTION

Therefore, an object of the present invention is to provide an improved technique for obtaining a detailed profile of interference in a cellular communication system.

Another object of the present invention is to provide an interference monitoring technique for a cellular communication system, which is achieved without the interference measurement apparatus.

Still another object of the present invention is to provide a technique for accurately obtaining a profile of interference in a cellular communication system.

In order to achieve an aspect of the present invention, a cellular communication system is composed of a cell station and a maintenance terminal. The cell station provides a communication service for a personal station, and also executes continuous monitoring of an interference wave during a period to produce an interference monitor data representative of a property of the interference wave. The maintenance terminal produces an interference profile based on the property.

Both of the communication service and the continuous monitoring are preferably achieved through the same antenna.

It is also preferable that the cell station includes a monitoring unit which continuously monitors an electric field intensity of the interference wave during the period, and the property represented by the interference monitor data includes the electric field intensity.

It is also preferable that the maintenance terminal sends first and second requests, and the cell station providing the communication service in response to the first request, and monitoring the interference wave in response to the second request.

The maintenance terminal preferably displays the interference profile.

When the communication service is executed based on a TDMA system protocol, the period during which the monitoring of the interference is executed preferably includes a slot determined by the TDMA system protocol.

It is also preferable that the cell station checks whether the slot is used for providing the communication service, and continuously monitors the interfering wave during the slot when the slot is not used for providing the communication service.

In order to achieve another aspect of the present invention, a cellular communication system is composed of a plurality of cell stations and a maintenance terminal. The plurality of cell stations provide a communication service for a personal station. In addition, each of the cell stations continuously monitors an interference wave during a period to produce interference monitor data representative of an electric field intensity of the interference wave. The maintenance terminal receives the interference monitor data from each of the cell stations and determines an incoming direction of the interference wave based on the interference monitor data.

In order to achieve still another aspect of the present invention, A method of operating a cellular communication system is composed of:

providing a communication service for a personal station by a cell station;

continuously monitoring of an interference wave during a period by the cell station;

producing an interference monitor data representative of a property of the interference wave, producing an interference profile based on the property.

Both of providing the communication service and the continuous monitoring are preferably achieved through the same antenna included in the cell station.

It is preferable that the monitoring includes continuously monitoring an electric field intensity of the interference wave during the period, and the property includes the electric field intensity.

It is preferable that the method is further composed of receiving a request, and then providing communication service, and receiving a reciuest and then continuously monitoring the interference wave and recording an interference profile independent of communication signal transmission, in response to said request.

When the communication service is executed based on a TDMA system protocol, the period preferably includes a slot determined by the TDMA system protocol.

In this case, it is also preferable that the method is further composed of checking whether the slot is used for providing the communication service, and the continuously monitoring is executed during the slot when the slot is not used for providing the communication service.

In order to achieve yet still another aspect of the present invention, a method of operating a cellular communication system is composed of:

providing a communication service for a personal station by a plurality of cell stations;

continuously monitoring of an interference wave during a period by the plurality of cell stations cell stations;

producing interference monitor data representative of electric field intensities of the interference wave by each of the plurality of cell stations cell stations;

determining an incoming direction of the interference wave based on the interference monitor data.

DESCRIPTION OF THE PREFERRED EMBODIMENTS

A cellular communication system according to the present invention will be described below in detail with reference to the attached drawings.

First Embodiment

Figure 1:
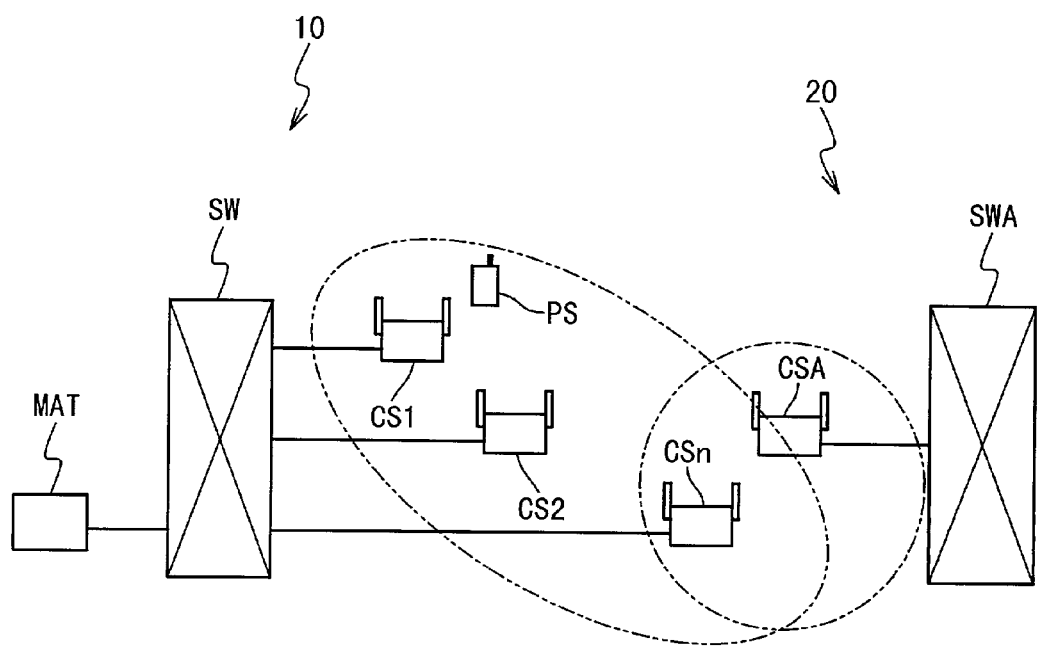
FIG. 1 is a block diagram of a cellular communication system in a first embodiment.

FIG. 1 shows a cellular communication system according to the present invention in a first embodiment. The cellular communication system 10 includes an exchange SW and a plurality of cell stations CS1–CSn. The cell stations CS1–CSn are allocated in a service area of the cellular communication system.

The cell stations CS1–CSn accommodate personal stations PS to provide radio communication services on the basis of a TDMA system protocol.

In addition, the cell stations CS1–CSn respectively monitor an interfering wave to produce interference monitor data representative of properties of the interfering wave, such as an electric field intensity of the interfering wave. The interfering wave may come from the other cell stations or from an independent cellular communication system 20. The independent cellular communication system 20 is usually asynchronous with the cellular communication system 10.

The exchange SW is connected to the cell stations CS1–CSn. The exchange SW establishes a communication link between the personal stations PS and a public switched telephone network (not shown).

Also, the exchange SW receives the interference monitor data from each of the cell stations CS1–CSn.

A maintenance terminal MAT is connected to the exchange SW. The maintenance terminal MAT is a computer system provided for operation of an operator of the cellular communication system. The maintenance terminal MAT produces the profile of the interference on the basis of the interference monitor data and shows the profile on a display.

The maintenance terminal MAT includes a user interface (not shown) for receiving a request for the interference monitoring. The request is transmitted to the cell stations CS1–CSn, and the cell stations CS1–CSn monitors the interference in response to the request.

Figure 2:
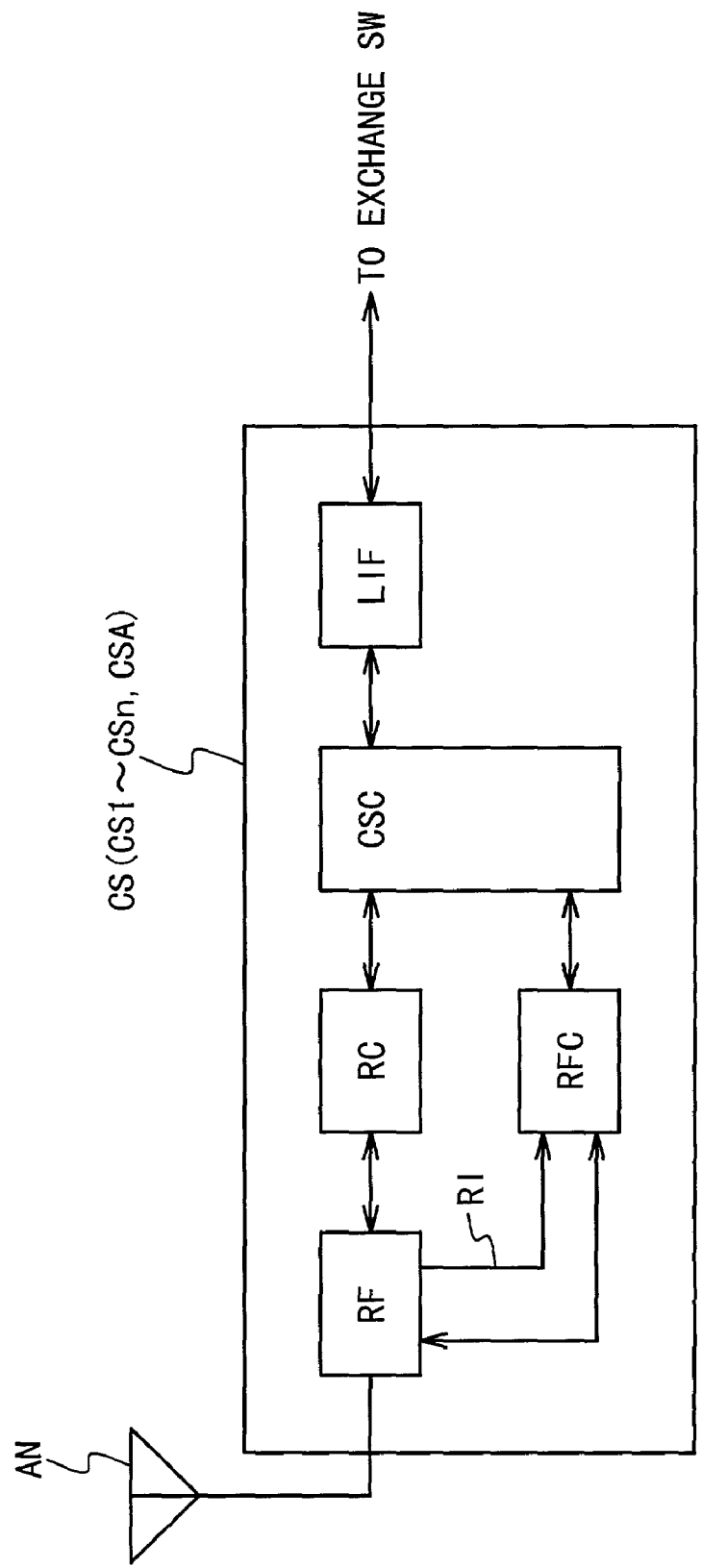
FIG. 2 is a block diagram of a cell station included in the cellular communication system.

FIG. 2 is a block diagram of the cell stations CS1–CSn. Each of the cell stations CS1–CSn includes an antenna AN, a radio interface RF, a codec RC, radio communication controller RFC, a cell station controller CSC, and a line interface LIF.

The communication services are provided for the personal stations PS by the antenna AN, the radio interface RF, the codec RC, and the line interface LIF under control of the cell station controller CSC.

For downlink transmissions, the line interface LIF receives inbound user messages from the public switched telephone network through the exchange SW. The codec encodes the inbound user messages to generate the RF downlink signals. The radio interface RF modulates the RF downlink signals. The modulated RF downlink signals are transmitted by the antenna AN to the personal station PS.

For uplink communication, on the other hand, the antenna AN receives RF uplink signals from personal station PS. The radio interface RF demodulates the RF uplink signals. The codec RC decodes the demodulated uplink signals to reproduce outbound user messages. The line interface LIF transfers the outbound user messages to the exchange SW.

The radio communication controller RFC controls the radio interface RF. The radio communication controller RFC is responsive to the above-mentioned request from the maintenance terminal MAT.

The radio interface RF exclusively operates to provide the radio communication services or to monitor the interference under control of the radio communication controller RFC. When directed by the radio communication controller RFC to provide the communication services, the radio interface RF modulates the RF uplink signals from the personal stations PS and demodulates the downlink signals to be transmitted to the personal stations PS. When directed to monitor the interference, on the other hand, the radio interface RF monitors the electric field intensity of the interfering wave to produce an electric field intensity signal RI that is proportional to the electric field intensity of the interfering wave.

The monitoring of the interference wave is continuously executed for a frame, which is a period determined by the TDMA system protocol. The frame consists of a plurality of slots, typically eight slots.

While the interference monitoring is executed by the radio interface RF, the radio communication controller RFC receives and converts the electric field intensity signal RI into the interference monitor data. The interference monitor data is representative of the electric field intensity of the interfering wave. The radio communication controller RFC transmits the interference monitor data to the maintenance terminal MAT through the exchange SW. The maintenance terminal MAT produces the profile of the interference on the basis of the interference monitor data.

The monitoring of the electric field intensity is preferably executed with respect to all of the frequencies used for the communication service. This allows the maintenance terminal MAT to produce a more detailed profile of the interference.

In the cellular communication system, the interference monitoring as well as the provision of the radio communication services is executed in response to the request transmitted by the maintenance terminal MAT.

When the maintenance terminal MAT receives the request for the provision of the radio communication services by the user interface, the maintenance terminal MAT transfers the request to the cell stations CS1–CSn and exchange SW. The cell stations CS1–CSn and the exchange SW provide the radio communication service for the personal stations PS utilizing the TDMA system protocol.

When the maintenance terminal MAT receives request for the interference monitoring by the user interface, the maintenance terminal MAT transfers the request to the cell stations CS1–CSn.

In each of the cell stations CS1–CSn, the radio communication controller RFC directs the radio interface RF to monitor the electric field intensity of the interfering wave in response to the request. Then, the radio interfaces RF start to monitor the interfering wave, and respectively generate the electric field intensity signals RI.

The radio communication controller RFC converts the electric field intensity signals RI into the interference monitor data. The radio communication controller RFC respectively transmits the interference monitor data to the maintenance terminal MAT.

After receiving the interference monitor data, the maintenance terminal MAT produces a detailed profile of the interference in the service area of the cellular communication system. The production of the detailed profile is achieved based on the interference monitor data respectively transmitted by the cell stations CS1–CSn. The maintenance terminal MAT shows the detailed profile on a display therein.

The detailed profile provided by the maintenance terminal MAT allows the operator of the cellular communication system to recognize the conditions of the cellular communication system.

Figure 3:
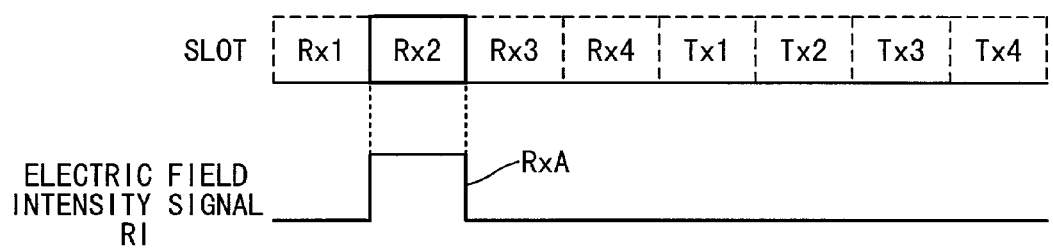
FIG. 3 shows a typical waveform representative of an electric field intensity of an interference wave.

For example, the timing of the interference wave suggests the origin of the interference wave. FIG. 3 shows a typical waveform of the electric field intensity signal RI for a frame that consists of slots Rx1-Rx4 and Tx1-Tx4. An interference pulse RxA is included in the electric field intensity signal RI. The interference pulse RxA is synchronous with the timing of the slots determined by the TDMA system protocol. This implies that the origin of the interference wave is another of the cell station CS1–CSn included in the cellular communication system 10.

Figure 4:
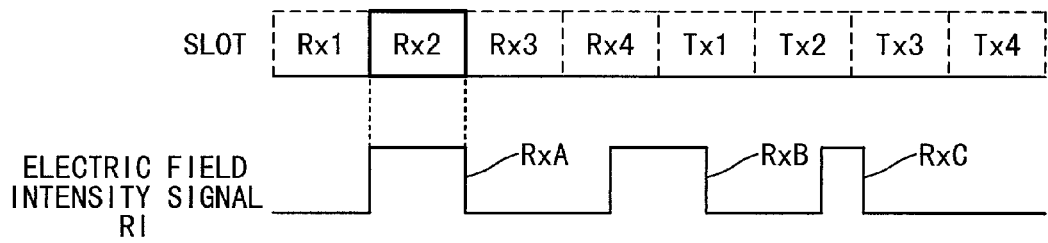
FIG. 4 shows another typical waveform representative of an electric field intensity of an interference wave.

FIG. 4 shows another typical waveform of the electric field intensity signal RI, when the independent cellular communication system 20 and some other communication system generate the interference wave. Interference pulses RxA, RxB and RxC are included in the electric field intensity signal RI. The interference pulse RxA is synchronous with the timing of the slot, which implies the origin of the interference pulse RxA is the cellular communication system 10 itself. On the other hand, the interference pulses RxB and RxC is not synchronous with the timing of the slot, which implies the origins of the interference pulses RxB and RxC are communication systems which is not synchronous with the cellular communication system 10.

The continues monitoring of the interference for a certain period is of importance for determining the timing of the interference. If the interference monitoring is executed only at a certain timing of a slot, which is usually at the beginning of the slot, the timing when the interference starts can not be determined. The continuos monitoring enables the detection of the change in the interference wave during the slot and thus enables the determination of the timing of the interference. The continuos monitoring is preferably executed for at least one slot more preferably for a frame, which consists of a plurality of the slots.

Figure 5:
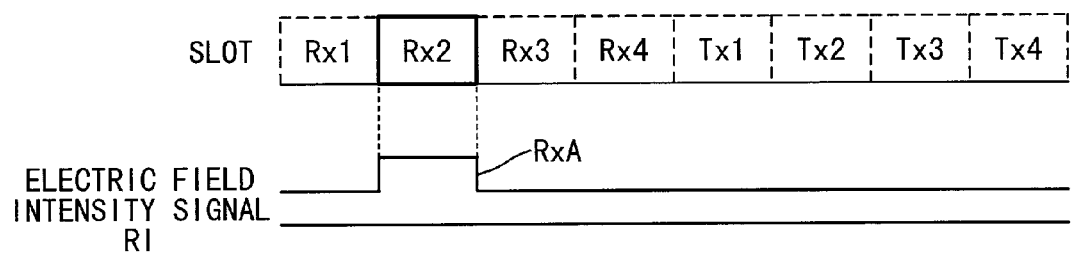
FIG. 5 shows still another typical waveform representative of an electric field intensity of an interference wave.

FIG. 5 shows still another example of the waveform of the electric field intensity signal RI. The electric field intensity signal RI includes a continues interfering level as well as an interference pulse RxA. This means that the cell stations CS1–CSn receive a continuous interfering wave. The continues monitoring by the cell stations CS1–CSn also enables the detection of the continuous interfering wave.

The detailed profile, which is provided by the maintenance terminal MAT, preferably includes the incoming direction of the interference wave. The maintenance terminal MAT estimates the incoming direction of the interference wave on the basis of the interference monitor data from the cell stations CS1–CSn. The maintenance terminal MAT is notified of the electric field intensities at the plurality of the cell stations CS1–CSn by the interference monitor data. The plural sources of the electric field intensities enable the detection of the incoming direction of the interference wave by the maintenance terminal MAT.

As described, the cellular communication system in this embodiment has a function of continuously monitoring of the interference. This eliminates the necessity of using an interference monitoring apparatus for monitoring of the interference.

In addition, the continuous monitoring provides a detailed profile of the interference in the cellular communication system. The detailed profile is useful for designing cellular communication systems.

Furthermore, the self-monitoring of the interference by the cellular communication system improves the accuracy of the interference monitoring. Conventionally, an interference monitoring apparatus is set besides the cell station for the interference monitoring. This makes a difference between the position at which the interference monitoring is executed and the position of the antenna for the communication service. The difference causes an error of the monitoring of the interfering wave. In the cellular communication system, both of the communication service and the interference monitoring are executed through the same antenna AN, and thereby the improved interference monitoring is achieved.

Second Embodiment

In a second embodiment, the operation of the cellular communication system is modified for monitoring the interference without interrupting the communication service.

Figure 6:
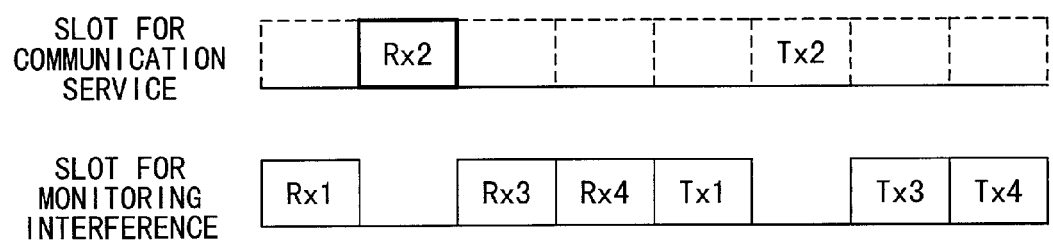
FIG. 6 shows an operation of the cellular communication system in a second embodiment.

As shown in FIG. 6, the interference monitoring is executed during the slots that are not used for the communication service. At the beginning of each slot, the cell stations CS1–CSn checks whether the slot should be used for the provision of the communication service. When the cell stations CS1–CSn determines that the slot is used for the communication service, the cell stations CS1–CSn provides the communication service. Otherwise the cell stations CS1–CSn monitors the electric field intensity of the interference wave and produce the interference monitor data. As for the example shown in FIG. 6, the slots Rx2 and Tx2 are used for the communication service. The slots Rx1, Rx3, Rx4, Tx1, Tx3, and Tx4 are used for the interference monitoring.

In the second embodiment, the interference monitoring is executed without interrupting the communication service, and thereby the user utility of the cellular communication system is improved.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A cellular communication system comprising:
   a cell station which provides a communication service for a personal station,
   said cell station executing continuous interference monitoring during a requested period;
   said cell station receiving said requested period from a maintenance terminal and then producing interference data representative of at least one property of an interfering wave, or said interference data representative of an absence of an interference wave; and
   said maintenance terminal requesting said requested period and producing a data record of at least one interference profile based on said at least one property.

2. The cellular communication system according to claim 1, wherein said cell station includes an antenna, and both of said communication service and said continuous monitoring are achieved through said antenna.

3. The cellular communication system according to claim 1, wherein said cell station includes a monitoring unit which continuously monitors an electric field intensity of said interfering wave during said requested period, and
   said at least one property includes said electric field intensity.

4. The cellular communication system according to claim 1, wherein said maintenance terminal sends first and second requests, and
   said cell station provides said communication service in response to said first request, and monitors said interference data in response to said second request.

5. The cellular communication system according to claim 1, wherein said maintenance terminal displays said at least one interference profile.

6. The cellular communication system according to claim 1, wherein said communication service is executed based on a TDMA system protocol, and
   said period includes a slot determined by said TDMA system protocol.

7. The cellular communication system according to claim 6, wherein said cell station checks whether said slot is used for providing said communication service, and continuously monitors said interfering wave during said slot when said slot is not used for providing said communication service.

8. A cellular communication system comprising:
   a plurality of cell stations which provide a communication service for a personal station, each of said cell stations continuously monitoring interference during a requested period to produce interference data at least representative of an electric field intensity of an interfering wave;

said cell station receiving said requested period from a maintenance terminal;

said maintenance terminal which requests said requested period and receives said interference data from each of said cell stations, produces a data record of an interference profile and determines an incoming direction of an interfering wave based on said interference data.

9. A method of operating a cellular communication system comprising:

providing a communication service for a personal station by a cell station;

continuously monitoring of an interfering wave during a requested period by said cell station;

requesting of said reciuest period by a maintenance terminal;

said cell station receiving said requested period from a maintenance terminal and then producing an interference data representative of at least one property of an interfering wave; and producing a data record of an interference profile based on said at least one property.

10. The method according to claim 9, wherein both of providing said communication service and said continuous monitoring are achieved through the same antenna included in said cell station.

11. The method according to claim 9, wherein said continuously monitoring includes an electric field intensity of said interfering wave during said requested period.

12. The method according to claim 9, wherein said continuously monitoring of said interfering wave are exclusively executed in response to said request.

13. The method according to claim 9, wherein said communication service is executed based on a TDMA system protocol, and said period includes a slot determined by said TDMA system protocol.

14. The method according to claim 13, further comprising checking whether said slot is used for providing said communication service, wherein said continuously monitoring is executed during said slot when said slot is not used for providing said communication service.

15. A method of operating a cellular communication system comprising:

providing a communication service for a personal station by a plurality of cell stations;

continuously monitoring of an interfering wave during a requested period by said plurality of cell stations;

requesting said request period by a plurality of maintenance terminals;

said plurality of cell station receiving said requested period from a maintenance terminal and then producing interference data at least representative of electric field intensities of an interfering wave by each of said plurality of cell stations; and determining an incoming direction of said interfering wave based on said interference data.

16. The cellular communication system according to claim 1, wherein said requesting said requested period is independent of concurrent or impending communication signal transmission.

17. The cellular communication system according to claim 1, wherein said maintenance terminal sends a request for said interference data to said cell station, and said cell station continuously records said interference data during the requested period, and produces a data record of said at least one interference profile.

18. The cellular communication system according to claim 1, wherein said maintenance terminal displays said at least one property of said interference data in a profile, as a function of at least one variable.

19. The cellular communication system according to claim 1, wherein said cell station includes an interference monitor for acquisition of said interference data.

* * * * *